United States Patent [19]
Bryant et al.

[11] Patent Number: 6,101,069
[45] Date of Patent: Aug. 8, 2000

[54] MAGNETIC HEAD CLEANING FILM STRIP AND METHOD OF MAKING SAME

[75] Inventors: Steven M. Bryant, Holley; Paul L. Taillie, Rochester, both of N.Y.

[73] Assignee: Eastman Kodak Company, Rochester, N.Y.

[21] Appl. No.: 09/217,143

[22] Filed: Dec. 21, 1998

[51] Int. Cl.[7] ........................................................ G11B 5/41
[52] U.S. Cl. ........................................................... 360/128
[58] Field of Search ............................. 360/128; 396/319; 15/DIG. 12

[56] References Cited

U.S. PATENT DOCUMENTS 5,776,668   3/1999   Oltean et al. ............................. 430/523
5,887,206   3/1999   Sasaki et al. ............................ 396/319

Primary Examiner—Robert S. Tupper
Attorney, Agent, or Firm—Francis H. Boos, Jr.

[57] ABSTRACT

A film-based magnetic head cleaning medium in which the head cleaning areas are formed by puncturing the film all the way through with a plurality of sharp prongs to produce an area of projecting puncture edges which are raised from the surface of the film thereby creating roughened areas which scrape accumulated debris from the magnetic head as the film is passed between the magnetic head and facing load pressure pad.

7 Claims, 2 Drawing Sheets

MAGNETIC HEAD CLEANING FILM STRIP AND METHOD OF MAKING SAME

FIELD OF THE INVENTION

The invention relates to film strips, with or without photosensitive emulsion coated thereon, in which a physical characteristic of the film strip is modified to serve as a magnetic head clean mechanism and to a method of producing such a film strip.

BACKGROUND OF THE INVENTION

In the Advanced Photo System (APS), transparent film base is coated on one surface with photographic emulsions and on the opposite surface with a virtually transparent layer of magnetic recording material that allows magnetic recording and reading of photographic data to and from the film strip utilizing a magnetic read/write head in the camera or photofinishing equipment or film scanner. As is well known in the magnetic recording art, debris consisting of dust and magnetic recording material builds up on the magnetic head and degrades the signal transfer performance of the read/write operation. The problem is more critical in a photographic system than in video or audio tape recording because the virtually transparent magnetic layer on film results in a lower strength magnetic signal on the film strip than can be achieved with thicker, more dense magnetic layers on video and audio tape. As a consequence, signal detection on film magnetic layers can be seriously degraded by microscopic buildup of debris on the magnetic head that might not produce noticeable effects in a video or audio tape recording system.

A known technique relied on for a degree of magnetic head cleaning in an APS camera is to rely on edges of film metering perforations formed in the film which are in line with the film's magnetic data tracks to dislodge the debris built up on the camera magnetic heads. However, APS film has perforations only along one edge of the film. Equipment, such as film scanners which read data recorded in tracks along both edges of the film do not benefit from any cleaning action obtained from these perforations.

U.S. Pat. No. 5,715,488 proposes the use of a special perforation in the trailer portion of the film strip coupled with apparatus that ensures that the film is advanced past the last image frame sufficiently to cause the edges of the specially added perforation to rub across the magnetic head on that side of the film. Even so, it has been found that reliance on perforation edges to perform head cleaning is not entirely satisfactory.

U.S. Pat. No. 4,661,874 proposes forming a cleaning surface on tape by impressing the tape with a heated, ridged die to form rows of raised surfaces on the side of the tape opposite the side impressed by the die. This appears to be a type of embossment that creates raised surfaces on the cleaning side of the tape. While such embossed raised surfaces are somewhat effective in dislodging loosely accumulated debris from the heads, they prove to be relatively ineffective in removing debris clogs that are fused or burnished onto the head surface. U.S. Pat. No. 5,488,529 proposes a head cleaning photographic film that employs a "step difference" on the cleaning side of the film. In one embodiment, the step difference comprises either an integrally formed or adhesively applied 100 µm raised area on the film surface as shown in FIG. 3b, (Example 2) Alternatively, this patent proposes that the step difference be a recess in the film, either in the form of a "through hole" (which is the same as a perforation as shown in FIG. 3b) or merely a "bottomed" hole (which is not further explained but would appear to be a hole that stops short of going all the way through the film). The "through hole" embodiment of this disclosure suffers from the same performance deficiency as the perforation of the '488 patent while the embossment embodiment has the same performance deficiency as the embossments of the '874 patent. The integrally formed and/or adhesively added projection, have the advantage of providing a raised edge to engage the debris on the head but has the disadvantages of providing only a single edge line to perform the cleaning operation, reducing its efficiency, and also of being difficult and costly to produce on film material.

SUMMARY OF THE INVENTION

It is therefore an object of the present invention to provide a head cleaning photographic film strip that is economical to produce and that efficiently removes debris build up from magnetic heads used for writing and reading magnetically recorded data to and from photographic film.

In accordance with a first aspect of the invention, a magnetic recording head cleaning medium is provided which comprises an extended length of photographic film base having an array of discrete punctures entirely through said film, the punctures terminating in raised edges that project beyond a surface of the film base to form a roughened area on a surface of the film base.

Another object of the invention is to provide a method of producing a magnetic recording head cleaning area on a photographic film base wherein the method comprises subjecting a first surface of the film base to puncturing by a two dimensional array of pointed prongs to form a corresponding two dimensional array of punctures through the film base leaving puncture edges raised from a second surface of the film base to thereby form a head cleaning area on the second surface of the film base.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
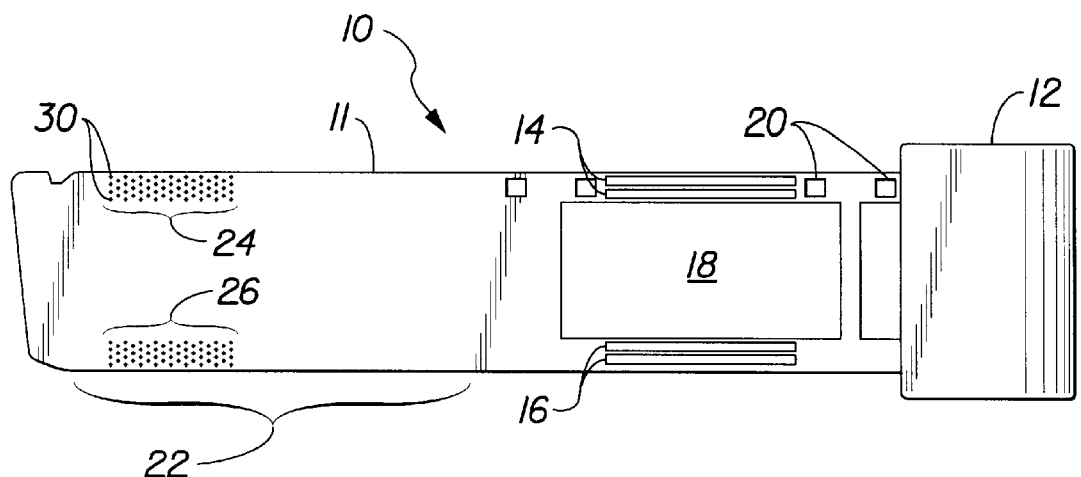
FIG. 1 is a plan view of an APS film strip projecting outwards of a film cartridge with areas of the film strip modified in accordance with the invention to provide magnetic recording head film cleaning areas on the surface of the film strip.

Referring to FIG. 1, an APS film strip 10 is shown partially extended from a film cartridge 12. The film strip comprises a transparent film base 11 with the side of the film base facing upwards from the paper being coated with a virtually transparent magnetic coating on which magnetic data tracks 14 and 16 are recorded along each edge of the film strip. The side of the film base facing into the paper is coated with a photographic emulsion in which image frames 18 have been exposed in frame areas delineated by metering perforations 20. At the leader end 22 of the film strip, a pair of magnetic recording head cleaning areas 24 and 26 have been formed in a manner described in detail below. The head cleaning areas are aligned with the data recording tracks along the length direction of the film strips so that each time the film is advanced in a camera or a film scanner having magnetic heads for reading the data in tracks 14 and 16, the head cleaning areas will rub across the head or heads and perform a cleaning operation to remove accumulated debris built up on the heads. Each head cleaning area comprises a two-dimensional array of rows 30 of punctures in the film base, the punctures going all the way through the film base to form a roughened area of raised edges projecting above the surface of the film base. Preferably, the punctures are staggered in successive rows, as shown, so as to present a uniform roughened area that engages the entire head cleaning surface.

Figure 2:
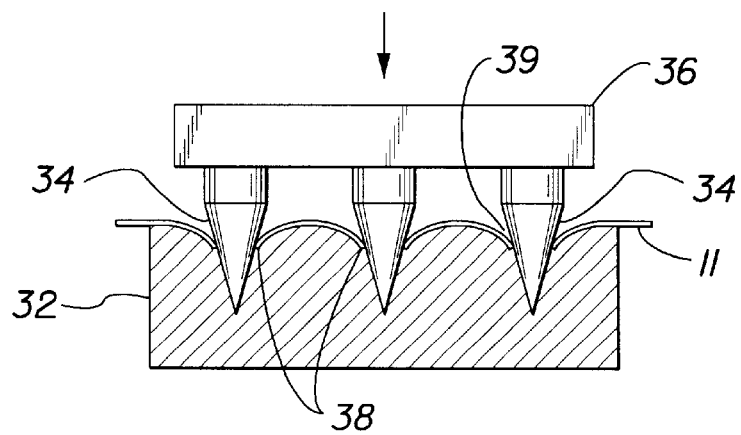
FIG. 2 is a graphical illustration of apparatus for carrying out the method of the invention for producing the head cleaning area on a film strip.
Figure 3:
FIG. 3 is a transverse cross section view of the head cleaning area of the film strip of FIG. 1 illustrating details of the head cleaning area in accordance with the invention.

FIG. 2 illustrates apparatus and a method for forming the punctures in the film base. The film base 11 is disposed between a base plate 32 and an array of sharp pointed prongs 34 mounted on a platen 36. The platen 36 is pressed against the film base with sufficient pressure to cause the prongs 34 to puncture the film base as shown. The base plate 32 may be a resilient, elastomeric material into which the prongs penetrate to allow the puncture edges 38 to project beyond the surface of the film base 11. This is to be distinguished from conventional film perforations in which dies are used to ensure that perforation edges are not raised and remain in the plane of the film base surface. Alternatively, the base plate 32 may be molded from rigid or semi-rigid material with depressions 39 formed therein to allow the desired penetration of the prongs to form the projecting puncture edges. FIG. 3 illustrates, in a diagrammatic way, how the puncture edges 38 are raised (projected) from the film base surface to create the roughened area used for head cleaning. It will be appreciated that this illustration is simplified and that in actual practice the punctures form jagged edges that enhance the roughened surface effect of the cleaning area.

Figure 4:
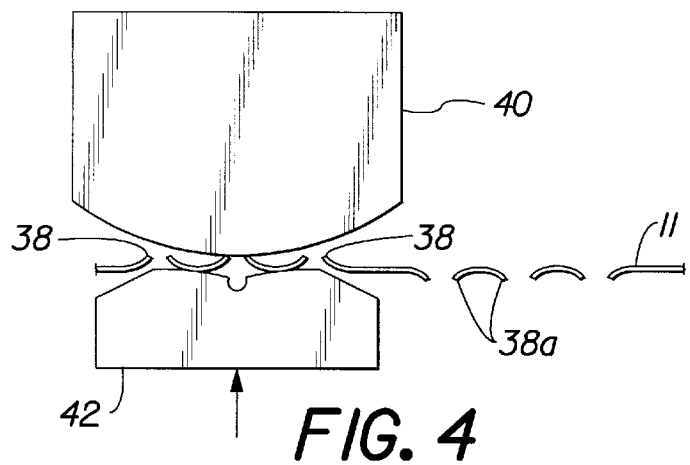
FIG. 4 is a side view of a magnetic head with a head cleaning portion of film illustrating the debris scraping function of the invention.

In FIG. 4, there is illustrated the scrubbing action of the raised puncture edges on a magnetic head 40 as the film base 11 passes between the head and the mating pressure load pad 42. In addition to the cleaning area with the puncture edges projecting in the direction of the magnetic head, the film base may have one or more additional cleaning areas in which the puncture edges 38a project in the reverse direction to allow cleaning of any debris buildup occurring on the pressure load pad.

Figure 5:
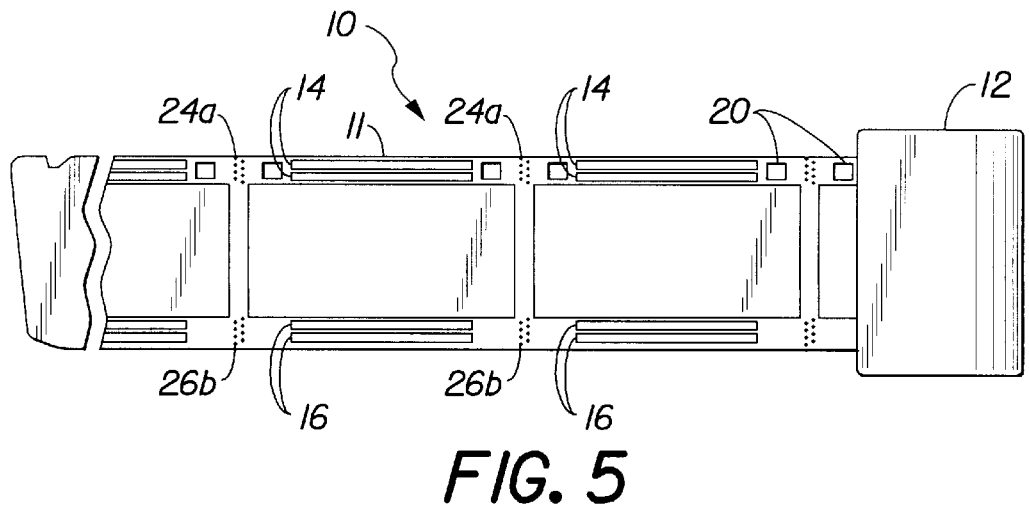
FIG. 5 is a plan view of APS film similar to that of FIG. 1 showing an alternative location of the head cleaning area on the film strip.
Figure 6:
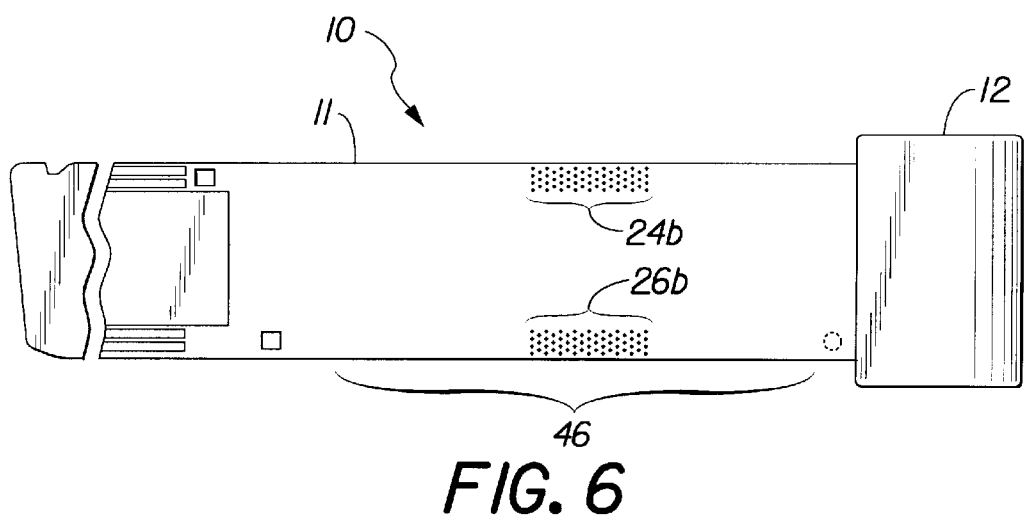
FIG. 6 is a plan view of APS film similar to that of FIG. 1 showing another alternative location of the head cleaning area.

FIG. 5 illustrates placement of the cleaning areas 24a, 26a at spaced locations along the length of the film strip between successive data tracks 14 and 16 while FIG. 6 illustrates a further alternative of locating the cleaning areas 24b, 26b in the trailer portion 46 of the film strip 10.

The use of punctures provides an advantage over reliance on existing perforations in the film or over the use of raised embossed indentations. APS film conventionally has perforations along one edge of the film strip which, in practice in photographic equipment, have been found to be not effective in removing debris built up on the magnetic heads aligned with that edge of the film strip. Further, the advantage of the punctures over the use of raised embossed indentations can be seen with reference to FIGS. 7a–7c. These figures show photographs taken of the same pair of magnetic read heads 50a, 50b from APS photofinishing equipment at three different stages of a comparative test procedure. In this procedure, APS film was passed across the heads multiple times until debris buildup 52 became evident as seen in FIG. 7a. This buildup included a particularly stubborn clog 53 of debris buildup that has been fused (burnished) onto the head in the vicinity of the magnetic head gap 54. Signal output from the head was then measured using APS film with data recorded on the magnetic layer. An embossed cleaning tape was then run three times across the heads. The length of the embossed area was two inches and each run consisted of a forward and back pass of the cleaning tape, for a total of twelve inches of embossed area cleaning action (3 runs×2 passes×2 inches). The result of the embossed tape cleaning action is shown in FIG. 7b. As can be seen, while some of the debris area 52 has been dislodged, probably loosely accumulated debris, the stubborn fused clog 53 remains. A length of punctured cleaning tape according to the invention was then run once (forward and back) over the heads, for a length of 2.7 inches of punctured area cleaning action (1 run×2 passes×1.35 inches). The result of this operation is shown in FIG. 7c which clearly shows that the single passage of the punctured cleaning tape completely removed the stubborn fused-on debris clog 53 as well as the residual loosely accumulated debris 52 that remained after the previous embossed area cleaning action. As part of these test examples, output signals were measured, peak to peak, to provide quantitative measurement of the comparative results, before cleaning action, after each cleaning action and, for control purposes, after thorough cleaning with alcohol. These results are shown in the following Table I.

TABLE I

| | |
|---|---|
| Signal level of uncleaned head 50b (FIG. 7a) | 1.47 volts |
| Signal level of head 50b cleaned with embossed cleaning film (FIG. 7b) | 1.62 volts |
| Signal level of head 50b cleaned with punctured cleaning tape according to the invention (FIG. 7c) | 2.27 volts |
| Control example signal level with head 50b cleaned with alcohol | 2.36 volts |

As can be seen, the use of embossed cleaning tape has little effect on head debris after multiple passes (runs) while only a single pass (run) of the cleaning tape punctured according to the invention provides results nearly as good as the control example using alcohol to thoroughly remove the debris.

The invention has been described in detail with particular reference to certain preferred embodiments thereof, but it will be understood that variations and modifications can be effected within the spirit and scope of the invention. For example, while the illustrated embodiments employ the head cleaning areas formed on photographic film having emulsion and magnetic coatings, the head cleaning areas may alternatively be formed on bare photographic film base to produce a strip whose sole purpose is to serve as a head cleaning medium. Also, although photographic film base material is described in the preferred embodiments disclosed herein, primarily because of its availability and compatibility film photographic film drive equipment, alternative film materials may be employed, including opaque film as opposed to transparent film materials.

PARTS LIST

| | |
|---|---|
| 10 | film strip |
| 11 | film base |
| 12 | film cartridge |
| 14, 16 | magnetic data track |
| 18 | image frames |
| 20 | perforations |
| 22 | leader end |
| 24, 24a, 24b | head cleaning areas |
| 26, 26a, 26b | head cleaning areas |
| 30 | rows |
| 32 | base plate |
| 34 | prongs |
| 36 | platen |
| 38, 38a | puncture edges |
| 39 | depressions |
| 40 | magnetic head |
| 42 | load pad |
| 46 | trailer portion |
| 50a,b | magnetic read heads |
| 52, 53 | debris buildup on magnetic heads |
| 54 | signal read head gap |

What is claimed is:

1. A magnetic recording head cleaning medium comprising an extended length of photographic film base having an array of discrete punctures entirely through said film, the punctures terminating in raised edges that project beyond a surface of the film base to form a roughened area on a surface of the film base.

2. The head cleaning medium of claim 1 wherein said array is a two-dimensional array of rows of punctures.

3. The head cleaning medium of claim 2 wherein said rows of punctures are staggered such that punctures of one row are interspersed between punctures of an adjacent row.

4. A method of producing a magnetic recording head cleaning area on a photographic film base, comprising:

subjecting a first surface of the film base to puncturing by a two-dimensional array of pointed prongs to form a corresponding two-dimensional array of punctures through the film base leaving puncture edges raised from a second surface of the film base to thereby form a head cleaning area on the second surface of the film base.

5. A method of producing a magnetic recording head cleaning area on a photographic film base, comprising:

disposing the film base between a base plate and a two-dimensional array of pointed prongs;

advancing the array of pointed prongs against the film base and base plate under pressure until the prongs puncture through the film base to form a corresponding array of punctures through the film base leaving puncture edges raised from a surface of the film base to thereby form a head cleaning area on the film base;

releasing the prongs from the film base; and removing the punctured film base from between the prongs and the base plate.

6. The method of claim 5 wherein the base plate is an elastomeric material.

7. The method of claim 5 wherein the base plate is a rigid or semi-rigid material with indentations therein aligned with the pointed prongs to allow deformation of the film base punctures into the indentations thereby forming the raised punctures on the head cleaning area.

* * * * *